(12) United States Patent
Chikami et al.

(10) Patent No.: US 6,618,212 B2
(45) Date of Patent: Sep. 9, 2003

(54) LENS DRIVING APPARATUS AND PHOTOGRAPHIC APPARATUS

(75) Inventors: Mototaka Chikami, Ikeda (JP); Minoru Kuwana, Osaka (JP); Akira Kosaka, Yao (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/015,758

(22) Filed: Dec. 17, 2001

(65) Prior Publication Data

US 2002/0075571 A1 Jun. 20, 2002

(30) Foreign Application Priority Data

Dec. 19, 2000 (JP) .......................................... 2000-385460

(51) Int. Cl.[7] .............................................. G02B 15/14
(52) U.S. Cl. ...................... 359/699; 359/700; 359/696
(58) Field of Search ................................. 359/696, 699, 359/700, 701, 704

(56) References Cited

U.S. PATENT DOCUMENTS

| 5,113,261 | A | * | 5/1992 | Morisawa | 348/357 |
|---|---|---|---|---|---|
| 5,140,468 | A | * | 8/1992 | Kayanuma | 359/696 |
| 5,225,941 | A | | 7/1993 | Saito et al. | 359/824 |
| 6,002,534 | A | | 12/1999 | Ueyama | 359/824 |
| 6,453,123 | B1 | * | 9/2002 | Oshima | 396/79 |
| 6,456,444 | B1 | * | 9/2002 | Yumiki et al. | 359/696 |

* cited by examiner

*Primary Examiner*—Ricky Mack
(74) *Attorney, Agent, or Firm*—McDermott, Will & Emery

(57) ABSTRACT

A lens driving apparatus which drives a first and a second lens group arranged in the optical axis by a first drive means and a second drive means, wherein the apparatus has a first and a second cam followers extending mutually parallel in a right angle direction to the optical axis from the first and second lens groups and cam member having first and second cams arranged along the optical axis and respectively engaging the first and second cam followers.

8 Claims, 8 Drawing Sheets

LENS DRIVING APPARATUS AND PHOTOGRAPHIC APPARATUS

This application is based on Patent Application No. 2000-385460 filed in Japan, the content of which is hereby incorporated by reference.

BACKGROUND OF THE INVENTION

1. Field of the Invention

The present invention relates to a lens driving apparatus, and specifically relates to a lens driving apparatus for driving a plurality of lens groups.

2. Description of the Related Art

A lens driving apparatus 18 for independently driving individual lens holders 5 and 6 via actuators 10a and 10b of a friction drive type which exert a drive force via friction bonding as shown in FIG. 1 has been proposed as a zoom lens for a compact photographic device.

The actuators 10a and 10b have bases 1a and 1b and drive shafts 3a and 3b respectively attached to an end of piezoelectric elements 2a and 2b in the extension-contraction direction. The drive shafts 3a and 3b are friction bonded to lens holders 5 and 6 via a force exerted by flat springs 4a and 4b (only 4b is shown in the drawing) set in a channel in the lens holders 5 and 6. When a drive voltage having, for example, a sawtooth pulse waveform is applied to the piezoelectric elements 2a and 2b, the drive shafts 3a and 3b are oscillated at different speeds in the axial direction as indicated by the arrows 90 and 92, such that the lens holders 5 and 6 are moved along the drive shafts 3a and 3b. The lens holders 5 and 6 are guided in the optical axis direction by a guide shaft 8, and the photographic element 7 is disposed on the focal plane of the optical system.

In the lens driving apparatus 18, since the lens holders 5 and 6 are independently and individually moved to optional positions by the respective actuators 10a and 10b, each lens holder 5 and 6 must have a specific positional relationship to obtain a desired photographic magnification and photographic distance. Particularly when zooming, the positions of the lens holders 5 and 6 must be detected with high precision in order to control the position of the lens holders 5 and 6.

Magnetic plates 11a and 11b are mounted on the respective lens holders 5 and 6, and MR sensors 12a and 12b (only sensor 12b is shown in the drawing) are provided on the frame opposite these magnetic plates 11a and 11b, such that the position of the lens holders 5 and 6 can be measured. Furthermore, a signal processing device is also required to control the drive of the respective actuators 10a and 10b based on the measurement data. It is difficult to make the lens driving device compact and of simple structure due to the use of the sensors and signal processing device.

SUMMARY

Accordingly, the technical problem resolved by the present invention is to provide a compact lens driving apparatus for driving a plurality of lenses, or a lens driving apparatus of simple structure.

The present invention focuses on the fact that normally each lens holder need not necessarily be moved since the relationship between the photographic magnification and the lens holder position is completely determined, and provides a lens driving apparatus having the following structure.

The lens driving apparatus is a type which drives in the optical axis direction a first and a second lens group arranged in the optical axis direction. The lens driving apparatus comprises first and second cam followers extending mutually parallel in a right angle direction to the optical axis from the first and second lens groups, cam member having first and second cams arranged along the optical axis and respectively engaging the first and second cam followers, first drive means for driving the first lens group in the optical axis direction, and second drive means for driving the second lens group in the optical axis direction.

In this structure, the cam member is not limited to a plate cam, and also may be, for example, a cylindrical cam member (cam drum).

According to this structure, for example, the second drive means exerts a supplemental force in the direction of movement of the second lens group, such that the second cam follower moves along the second cam of the cam member in conjunction with the drive of the first drive means, and the movement of the second cam follower is supplemented relative to the second cam of the cam member.

In this way, a smooth drive is possible and the cam member and first drive means can be compact even when it is difficult for the second lens group to move because the pressure angle of the second cam is large, and a large drive force is required for only the first drive means.

If the endface of the cam member is used as a cam (e.g., a plate cam), the cam member can be made even more compact by suitably controlling the first and second drive means so as to have the first and second cam follower follow the endface of the cam member.

Accordingly, it is unnecessary to detect the position of each lens group or control the drive of each lens group, and the lens driving apparatus can be made more compact.

It is desirable that the second cam of the cam member has first and second cam surfaces which are mutually opposed and have a gap therebetween wider than the second cam follower. The control means is linked to the drive of the first drive means, and the first and second drive means are controlled such that the second cam follower moves in the optical axis direction selectively along the one or another of the first or second cam surface of the second cam of the cam member.

In this structure, the position of the second lens group relative to the first lens group is different when the second cam follower is along the first cam surface of the second cam of the cam member, and when the second cam follower is along the second cam surface of the second cam of the cam member.

In this way, the lens groups can be moved in different modes, for example, for normal photography and macro photography.

The technical idea of switching the cam surface abutting the cam follower is widely suited to lens driving apparatuses, and the present invention provides a lens driving apparatus having the following structure.

The lens driving apparatus is a type which moves in the optical axis direction a first and a second lens group arranged in the optical axis direction. The lens driving apparatus comprises first and second cam followers, cam member, drive means, and force exerting means. The first and second cam followers extend in a right angle direction to the optical axis from the first and second lens groups. The cam member has first and second cams which respectively slide on the first and second cam followers. The second cam has first and second cam surfaces which are mutually opposed and have a gap therebetween wider than the second cam follower. The drive means drives the first lens group. The force exerting means selectively exerts a force on the second lens group in bilateral directions along the optical path such that the second cam follower selectively abuts the first or second cam surface of the second cam of the cam member.

In this structure, the cam member is not limited to a plate cam, and also may be, for example, a cylindrical cam used in replaceable lenses of single lens reflex cameras. The force exerting means may be an actuator capable of driving the second lens group in bilateral directions along the optical path, and may switch the direct of the exerted force by, for example, a spring.

According to this structure, the force exerting means switches the cam surface abutting the second cam follower by switching the direction of the force exerted on the second lens group, so as to drive the lens by selecting one of two modes of different positions of the second lens group relative to the first lens group.

In the lens driving apparatus having the aforesaid structures, it is desirable that the drive means is a drive means of the friction drive type including a drive force generator for generating a drive force for driving the lens group, and a drive force transmitter for transmitting a drive force from the drive force generator to the lens group via a friction force.

When a drive means of the friction drive type is used, the apparatus is easily made more compact. Furthermore, when a drive means is used for switching the cam surface abutting the cam follower, the control of the drive means is simple since any imbalance of the load is absorbed by sliding on the friction surface.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

A lens driving apparatus 100 of the first embodiment is described with reference to FIGS. 2 and 8.

Figure 1:
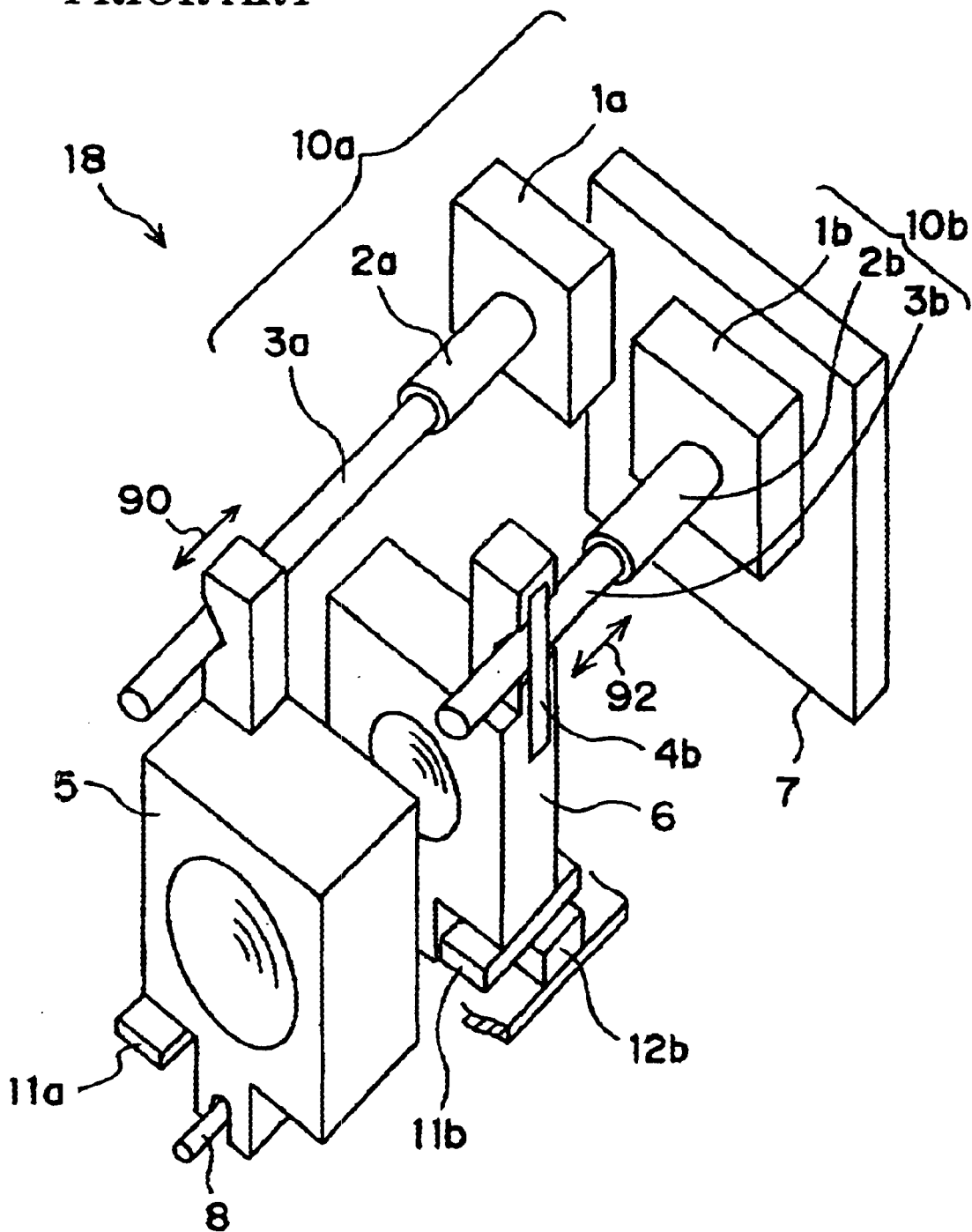
FIG. 1 is a perspective view of the essential part of a conventional lens driving apparatus.
Figure 2:
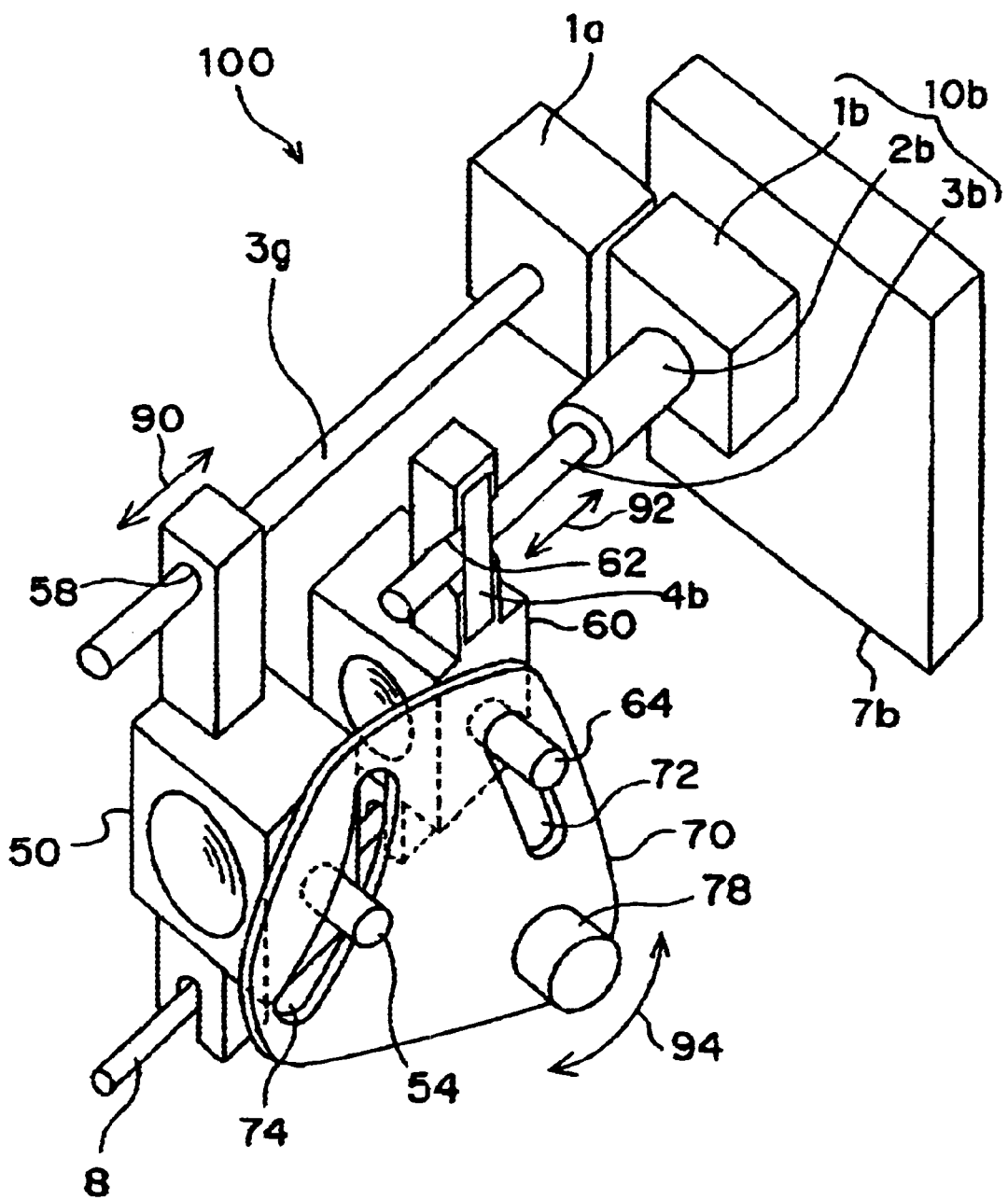
FIG. 2 is a perspective view of the essential part of a lens driving apparatus of a first embodiment of the present invention.

The lens driving apparatus 100 shown in FIG. 2 drives lens groups of a compact photographic device such as a digital camera, a video camera, a cellular phone and a personal computer for as portable device. Two front and back lens holders 50 and 60 guided in the optical axis direction engage a cam via a plate cam 70, and only the back lens holder 60 is driven by an actuator 10b.

The actuator 10b driving the back lens holder 60 is a friction drive type actuator.

The actuator 10b includes a base 1b, piezoelectric element 2b, and drive shaft 3b. The piezoelectric element 2b is arranged such that the extension-contraction direction matches the optical axis direction, and the base 1b is attached at one end in the extension-contraction direction and the shaft endface of the drive shaft 3b is attached at the other end in the extension-contraction direction. The drive shaft 3b is arranged in the optical axis direction, and friction-engages the lens holder 60 via a force exerted by a flat spring 4b on a channel of the back lens holder 60.

The front lens holder 50 is supported so as to freely move in parallel to the optical axis direction as indicated by the arrow 90 via a common guide shaft 8 and a special guide shaft 3g arranged in the optical axis direction. The common guide shaft 8 also engages the back lens holder 60, and guides and supports as indicated by the arrow 92. The special guide shaft 3g is attached to one end of the base la and passes through a guide hole 58 in the front lens holder 50.

The lens holders 50 and 60 are provided with cam pins 54 and 64 which protrude mutually parallel in a right angle direction to the optical axis.

The plate cam 70 is arranged parallel to the optical axis and adjacent to the lens holders 50 and 60, and is supported so as to be freely rotatable as indicated by the arrow 94 via a support shaft 78 parallel to cam pins 54 and 64. The plate cam 70 has cam holes 72 and 74 formed therein, such that cam pins 64 and 54 are inserted therethrough. In this way, the front and back lens holders 50 and 60 engage the cam and are moved in linkage therewith.

An image sensing element 7b for photoelectrically converting a photographic image and outputting image signals is provided at the image forming plane of the optical system including the lens groups supported by the lens holders 50 and 60.

The operation of the lens driving apparatus 100 is described below.

A drive voltage having a specific waveform is applied to the piezoelectric element 2b of the actuator 10b by a drive circuit not shown in the drawing, and the drive shaft 3b is oscillated in the axis direction, such that the lens holder 60 which is friction bonded to the drive shaft 3b is driven in the optical axis direction along the drive shaft 3b.

For example, a drive voltage having a sawtooth pulse waveform is applied to the piezoelectric element 2b to reciprocatingly move the drive shaft 3b in the optical axis direction at different speeds depending on the direction. In this way, when the drive shaft 3b moves relatively slowly, the lens holder 60 moves integratedly together with the drive shaft 3b via the friction force between the drive shaft 3b and the lens holder 60. On the other hand, when the drive shaft 3b moves relatively rapidly in the opposite direction, sliding is generated between the drive shaft 3b and the lens holder 60, such that only the drive shaft 3b moves, and the lens holder 60 remains stationary. In this way, the lens holder 60 can be moved along the drive shaft 3b.

Since the front and back lens holder 50 and 60 engage the plate cam 70 and are linked when the back lens holder 60 is moved in the optical axis direction by the actuator 10*b*, the front lens holder 50 also moves in the optical axis direction while maintaining a specific relationship with the back lens holder 60.

Figure 8:
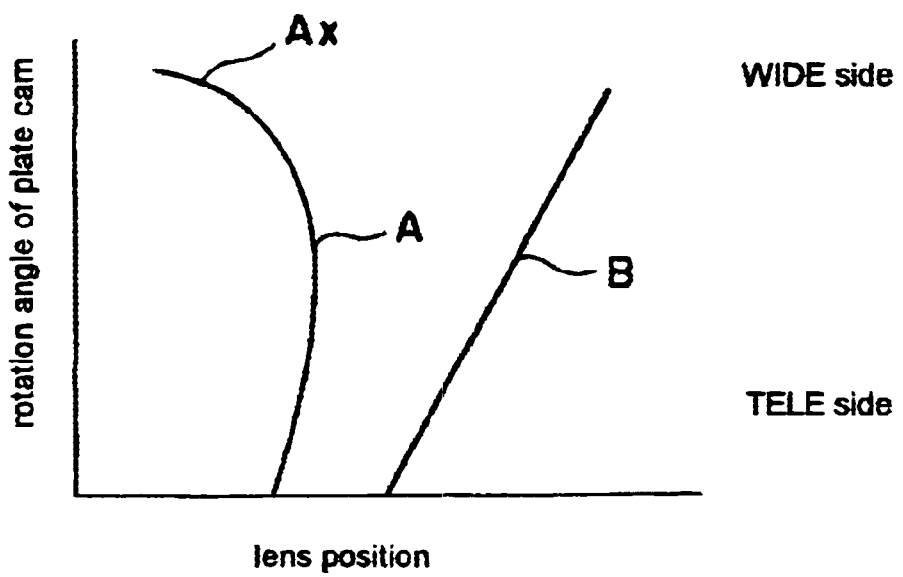
FIG. 8 illustrates the positional relationship of the plate cam and the lens holder.

FIG. 8 shows an example of the movement of the front and back lens holders 50 and 60 via the movement of the plate cam 70. Curve A represents the position of the front lens holder 50, and curve B represents the position of the back lens holder 60.

That is, when the back lens holder 60 is driven by the actuator 10*b*, the movement is transmitted to the front lens holder 50 linked to the plate cam 70, and the mutual positional relationship of the lens holders 50 and 60 is completely determined as shown in FIG. 8 via the shape of the cam holes 72 and 74 of the plate cam 70. Therefore, sensors for detecting the position of each lens holder, and a signal processing device for controlling the movement of the lens holders 50 and 60 while maintaining a constant relationship are unnecessary.

A lens driving apparatus 102 of a second embodiment is described below with reference to FIGS. 3 and 8.

Figure 3:
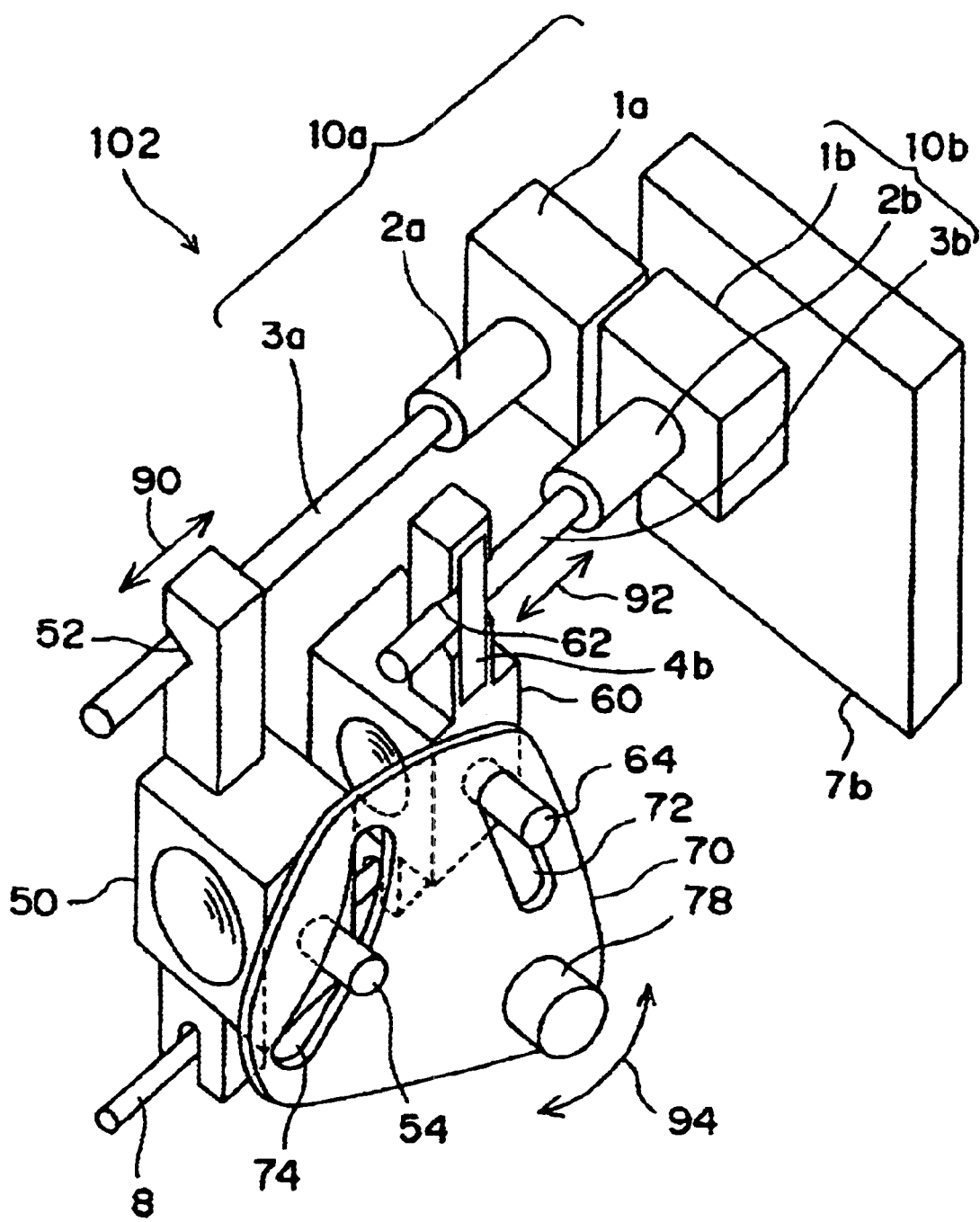
FIG. 3 is a perspective view of the essential part of a lens driving apparatus of a second embodiment of the present invention.

As shown in FIG. 3, the lens driving apparatus 102 has a structure largely similar to that of the lens driving apparatus 100 of the first embodiment, with the exception that an actuator 10*a* is provided for the front lens holder 50 and not only for the back lens holder 60. In the following description like parts are designated by like reference numbers, and the description focuses on the dissimilarities.

When the lens holders 50 and 60 are linked through the plate cam 70, the part of the largest pressure angle of the cam, e.g., the part represented by the symbol Ax in FIG. 8, is such that the pressure angle increases even more as the plate cam 70 is made more compact. When the pressure angle of the cam increases, it becomes difficult to smoothly drive the front lens holder 50 via the drive of the back lens holder 60.

In the lens driving apparatus 102 of the second embodiment, an actuator 10*a* is provided for supplementally driving the front lens holder 50, as shown in FIG. 3. The actuator 10*a* has a structure identical to the actuator 10*b* for driving the back lens holder 60. A base 1a and drive shaft 3*a* are attached at bilateral ends of a piezoelectric element 2*a* in the extension-contraction direction. The drive shaft 3*a* is friction bonded via a force exerted by a flat spring (not shown) on the channel 52 of the lens holder 50.

Although the lens driving apparatus 102 can simultaneously use the two actuators 10*a* and 10*b* to drive the lens holders 50 and 60, the actuator 10*b* on the back lens holder 60 aside is used for the main drive, and the actuator 10*a* on the front lens holder 50 side is used supplementally. That is, even when the cam pressure angle increases and the front lens holder 50 becomes difficult to move, the actuator 10*a* on the front lens holder 50 side provides a slight supplemental drive to smoothly drive the front lens holder 50. For example, when actuator 10*b* on the back lens holder 60 side is driven at a 5 V drive voltage, the actuator 10*a* on the front lens holder 50 side is supplementally driven at a 2 V drive voltage.

When the actuator 10*a* is used supplementally, a drive lag (delay and advance) is generated between the two actuators 10*a* and 10*b*, however, because the actuators 10*a* and 10*b* and the lens holders 50 and 60 are friction bonded, sliding is generated by the friction bonded part, such that the drive lag can be absorbed. In other words, even though there is a difference between the speed of the front lane holder 50 when the cam pin 54 completely follows the cam hole 74 of the plate cam 70 rotated by the actuator 10*b* and the speed of the front lens holder 50 driven by the actuator 10*a*, the speed difference is absorbed by the sliding between the drive shafts 3*a* and 3*b* and the lens holders 50 and 60. The front and back lens holders 50 and 60 are driven smoothly while a constant relationship is maintained by following the cam holes 74 and 72 of the plate cam 70.

Accordingly, the front and back lens holders 50 and 60 can be driven smoothly by simple controls such as providing a simple drive force or difference in drive speed between the actuators 10*a* and 10*b*. Furthermore, since the front and back lens holders 50 and 60 can be driven even when the cam pressure angle increases, the plate cam can be made more compact, and the entire apparatus can be made more compact.

Figure 4:
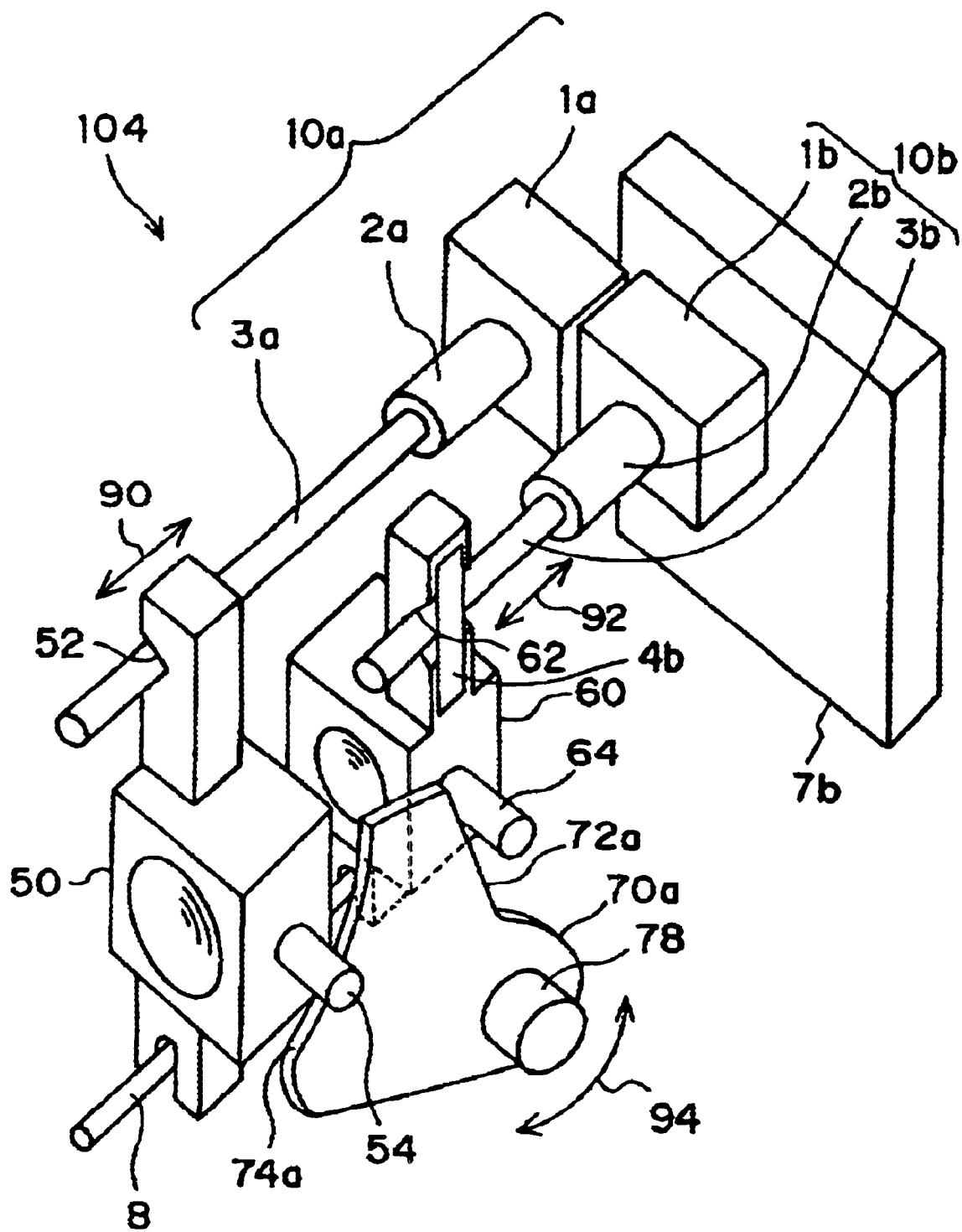
FIG. 4 is a perspective view of the essential part of a lens driving apparatus of a third embodiment of the present invention.

A lens driving apparatus 104 of a third embodiment is described below with reference to FIG. 4.

The lens driving apparatus 104 has a structure largely similar to that of the lens driving apparatus 102 of the second embodiment, with the exception of the shape of the plate cam 70*a*.

The plate cam 70*a* is an endface cam; the front and back endfaces 74*a* and 72*a* in the optical axis direction connect with the cam pins 54 and 64 of the respective front and back lens holders 50 and 60.

The method of operation of the lens driving apparatus 104 is described below.

Actuators 10*a* and 10*b* must provide a drive such that the cam pins 54 and 64 do not separate from the endfaces 74*a* and 72*a* of the plate cam 70*a*.

For this reason, when driving a lens group to the object side (left side in the drawing), the actuator 10*b* on the back lens holder 60 side, for example, is driven by a 5 V drive voltage, and the actuator 10*a* on the front lens holder 50 side is driven by a 2 V drive voltage. In this way, the cam pins 54 and 64 both move to the object side, but since the cam pin 54 on the front lens holder 50 side is delayed relative to the cam pin 64 on the back lens holder 60 side, the plate cam 70*a* is rotated in a counterclockwise direction in the drawing with both cam pins 54 and 64 engaged.

When a lens group is driven to the photographic element 7 side (right side in the drawing), the actuator 10*b* on the back lens holder 60 side, for example, is driven by a 2 V drive voltage, and the actuator 10*a* on the front lens holder 50 side is driven by a 5 V drive voltage. In this way, since the front cam pin 54 advances more than the back cam pin 64, the plate cam 70*a* is rotated in a clockwise direction in the drawing with both cam pins 54 and 64 engaged.

The plate cam 70*a* can be made even more compact by having the cam pins 54 and 64 of the front and back lens holders 50 and 60 press against the endfaces 72*a* and 74*a* of the plate cam 70*a* via the drive of the actuators 10*b* and 10*a*.

The lens driving apparatus of a fourth embodiment is described below with reference to FIGS. 5, 7, 9, and 10.

Figure 5:
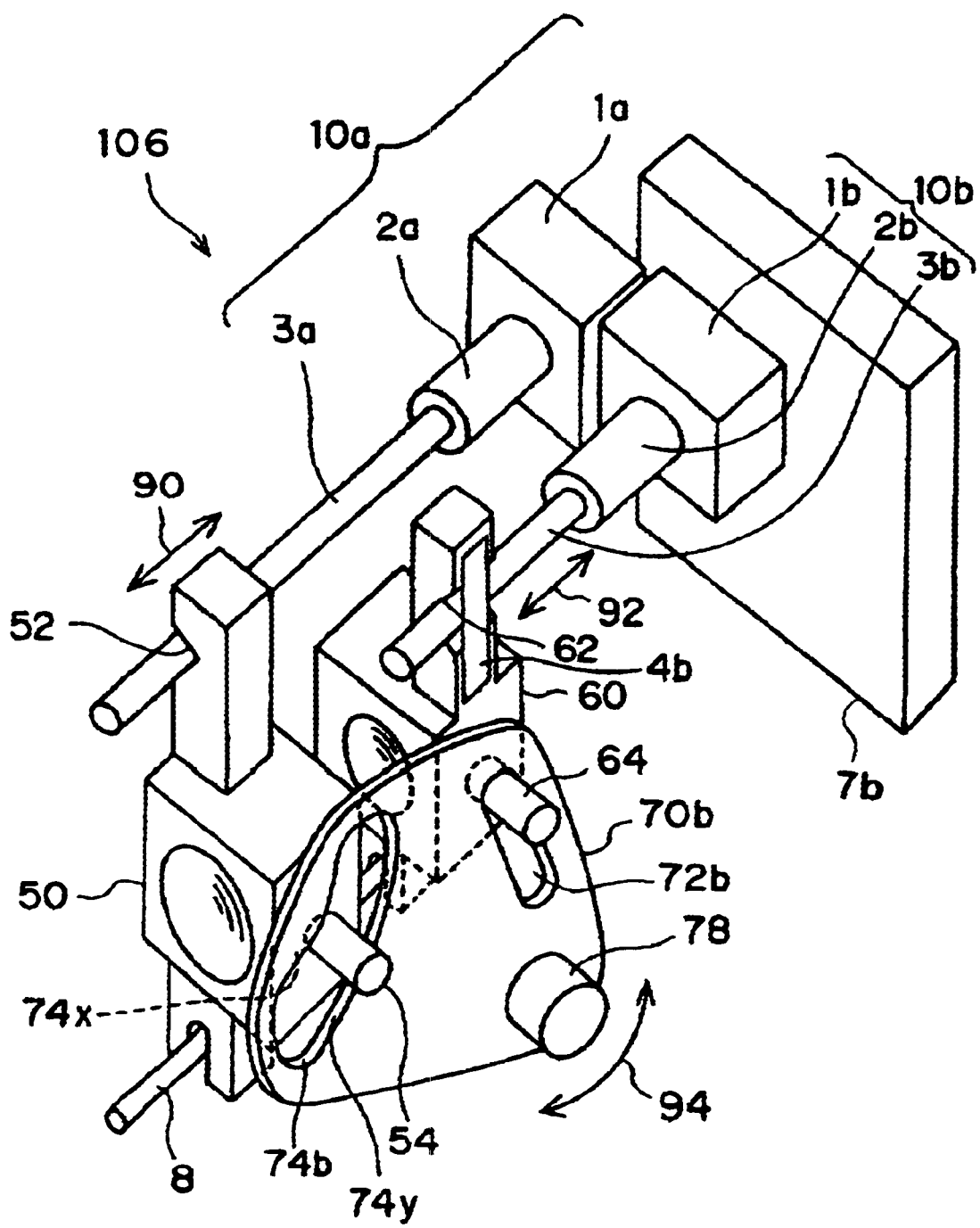
FIG. 5 is a perspective view of the essential part of a lens driving apparatus of a fourth embodiment of the present invention.

As shown in FIG. 5, a lens driving apparatus 106 has a structure largely similar to that of the lens driving apparatus 102 of the second embodiment, with the exception of the shape of the plate cam 70*b*.

That is, the plate cam 70*b* has cam holes 74*b* and 72*b* through which pass the cam pins 54 and 64 of the front and back lens holders 50 and 60. The front and back lens holders 50 and 60 move in the optical axis direction as indicated by the arrows 90 and 92 relative to the rotation of the plate cam 70*b* represented by the arrow 94.

Figure 7:
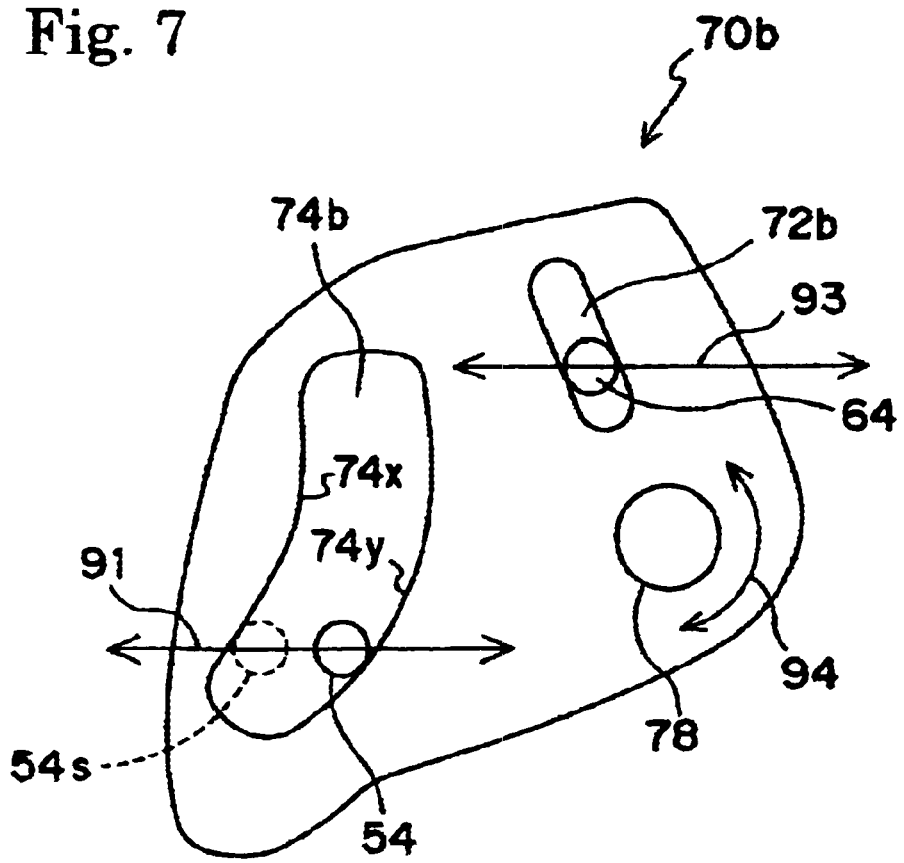
FIG. 7 is a plan view of the plate cam of FIG. 5.

As shown in FIG. 7, the width of the cam hole 72*b* through which is inserted the cam pin 64 on the back lens holder 64 side is approximately equal to the major diameter of the cam pin 64 passing therethrough, and no play is generated in the engagement of the hole and the pin.

The cam hole 74b through which passes the cam pin 54 of the front lens holder 54 allows play when the cam pin 54 passes therethrough. That is, the width of the cam hole 74b is larger than the major diameter of the cam pin 54. The cam pin 54 follows either the front and back cam surfaces 74x or 74y opposite the optical axis direction of the cam hole 74b, so as to be capable of performing two operations wherein the position of the lens holder 54 differs relative to the back lens holder 64.

Figure 9:
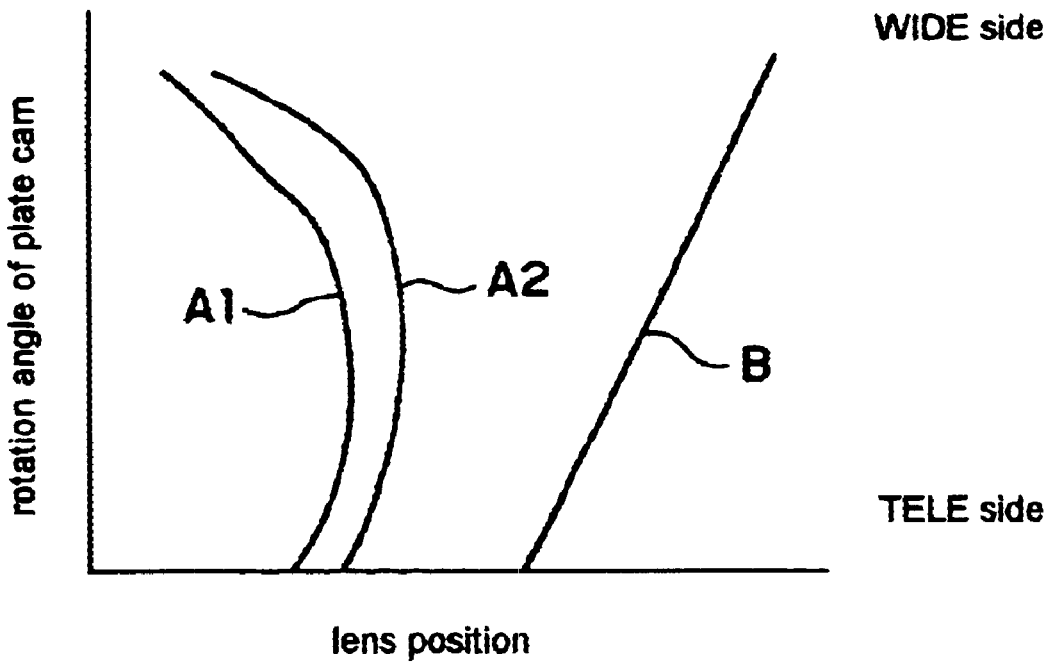
FIG. 9 illustrates the positional relationship of the plate cam and the lens holder.

For example, as shown in FIG. 9, the position of the back lens holder 64 is represented by curve B relative to the rotation angle of the plate cam 70b. On the other hand, the position of the front lens holder 54 is represented by curve A1 when the cam pin 54 abuts the front cam surface 74x, and is represented by curve A2 when the cam pin 54 abuts the back cam surface 74y. For example, normal photography is performed by combining curves A2 and B, and macro photography is performed by combining curves A1 and B.

The method of operation of the lens driving apparatus 106 is described below.

Figure 10:
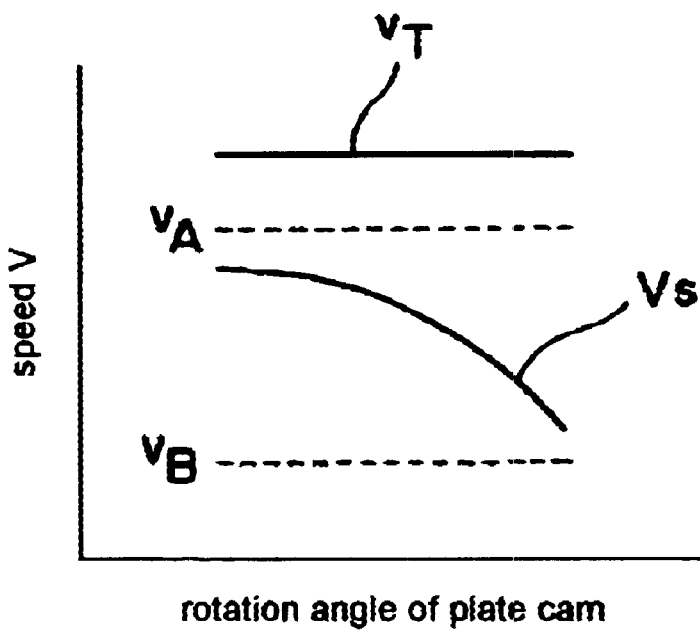
FIG. 10 illustrates the drive speed.

FIG. 10 is a graph showing the relationship between the rotation angle of the plate cam 70b and the speed of the cam pins 54 and 64. When the cam pin 54 of the front lens holder 50 is not engaged with the cam hole 74b of the plate cam 70b, and the cam pin 64 of the back lens holder 60 is driven at constant speed as represented by the symbol vT, the speed of the cam pin 54 of the front lens holder 50, i.e., the ideal speed of the cam pin 54 of the front lens holder 50, changes as represented by the curve vS when it is assumed that the cam pin 54 of the front lens holder 50 moves completely in accordance with the cam hole 74b of the plate cam 70b. In this case, to simplify, we do not distinguish between the cam pin 54 of the front lens holder 50 sliding on either of the front and back cam surface 74x or 74y of the cam hole 74b of the plate cam 70b. In the entire range of rotation of the plate cam 70b, a speed normally greater than the ideal speed of the cam pin 54 of the front lens holder 50 is designated vA, and a speed normally slower is designated vB.

When driven in accordance with the curves A2 and B of FIG. 9, for example during normal photography, the drive operation is as described below.

In FIG. 7, when the plate cam 70b is rotated in a counterclockwise direction, the actuator 10a on the front lens holder 50 side drives at the speed vB (e.g., 2 V), and the actuator 10b on the back lens holder 60 side drives at a constant speed vT (e.g., 5 V). In this way, since the cam pin 54 on the front lens holder 50 side is slow relative to the cam pin 64 on the back lens holder 60 side, the cam pin 54 abuts the back cam surface 74y as indicated by the solid line in FIG. 7. Accordingly, the cam pin 54 slides along the back cam surface 74y of the plate cam 70b.

When the plate cam 70b is rotated in the reverse direction (clockwise direction), the actuator 10a on the front lens holder 50 side drives in the reverse direction at a speed of vA (e.g., 4 V), and the actuator 10b on the back lens holder 60 side drives in the reverse direction at a constant speed vT (e.g., 5 V). Since the cam pin 54 on the front lens holder 50 side advances relative to the cam pin 64 on the back lens holder 60 side, the cam pin 54 slides along the back cam surface 74y of the plate cam 70b.

When driven in accordance with the curves A1 and B of FIG. 9, for example during macro photography, the drive operation is as described below.

When the plate cam 70b is rotated in a counterclockwise direction in FIG. 7, the actuator 10a on the front lens holder 50 side drives at the speed vA (e.g., 4 V), and the actuator 10b on the back lens holder 60 side drives at a constant speed vT (e.g., 5 V), such that the cam pin 54 on the front lens holder 50 side advances more than the cam pin 64 on the back lens holder 60 side, and the cam pin 54 abuts the front cam surface 74x as indicated by the dotted line 54s in FIG. 7.

When the plate cam 70b is rotated in the clockwise direction, the actuator 10a on the front lens holder 50 side drives in the reverse direction at a speed of vB (e.g., 2 V), and the actuator 10b on the back lens holder 60 side drives in the reverse direction at a constant speed vT (e.g., 5 V), such that the cam pin 54 on the front lens holder 50 side is slower than the cam pin 64 on the back lens holder 60 side, and the cam pin 54 abuts the front cam surface 74x of the plate cam 70b as indicated by the dotted line 54s in FIG. 7.

Figure 6:
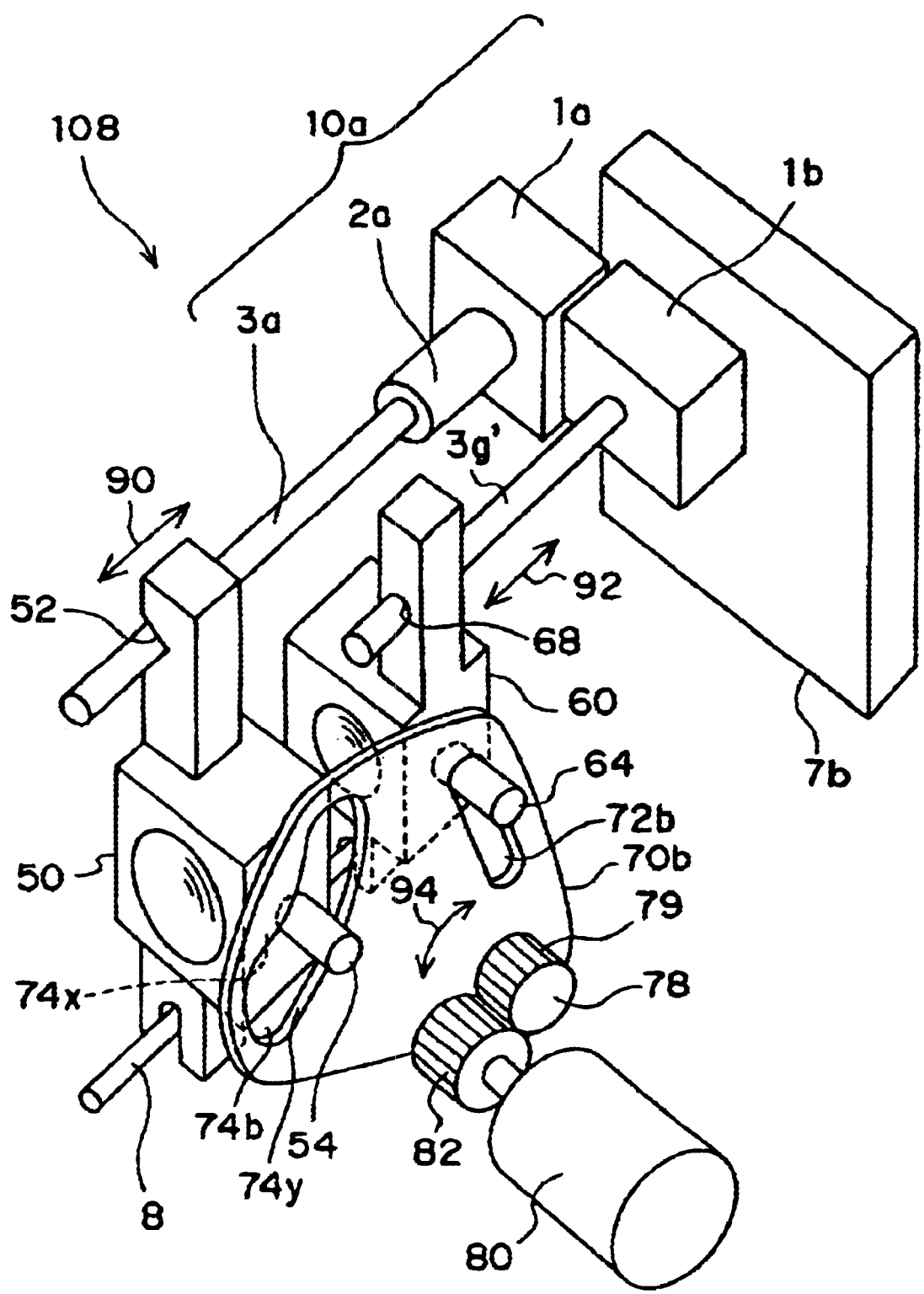
FIG. 6 is a perspective view of the essential part of a lens driving apparatus of a fifth embodiment of the present invention.

A lens driving apparatus 108 of a fifth embodiment is described below with reference to FIG. 6.

The lens driving apparatus 108 is largely similar to the lens driving apparatus 106 of the fourth embodiment, with the exception that an actuator is not provided for the back lens holder 60 and the plate cam 70b is driven by a motor 80.

A gear 79 is provided on the peripheral surface of a rotating shaft 78 supporting the plate cam 70b, and a gear 82 attached to the output shaft of a motor 80 engages the gear 79, and the plate cam 70b is rotated via the motor 80. The back lens holder 60 is supported so as to be freely movable in the optical axis direction by a common guide shaft 8 and a special guide shaft 3g'.

The lens driving apparatus 108 is capable of driving in two modes, by switching the drive of the motor 80 and the actuator 10a similar to the lens driving apparatus 106 of the fourth embodiment, such that the cam pin 54 of the front lens holder 50 abuts the front cam surface 74x, or abuts the back cam surface 74y, of the cam hole 74b of the plate cam 70b.

The lens driving apparatuses 100, 102, 104, 106, and 108 of each embodiment described above is capable of maintaining a normal mutual positional relationship of a lens holder 50 and lens holder 60 in a specific relationship by controlling the movement of the lens holder 50 relative to the other lens holder 60 by combining a plate cam 70, 70a, or 70b between two lens holders 50 and 60. In this way, sensors and signal processing devices which are required when individually driving individual lens groups become unnecessary.

Accordingly, the structure of the lens driving apparatuses 100, 102, 104, 106, 108 can be simplified and made more compact.

The present invention is not limited to the above described embodiment, and may be variously modified.

For example, an actuator of a type other than the friction drive type used in the embodiments may be used, e.g., an ultrasonic motor can be used with similar effectiveness to slide on a friction surface transmitting a drive force.

In the fifth embodiment, a spring or the like may be substituted fro the actuator 10a to switch the contact of the cam pin 54 relative to the front and back cam surfaces 74x and 74y by switching the direction of an exerted force. Furthermore, a drum cam or the like may be substituted for the plate cam 70b.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A driving apparatus comprising:
   a first holder having a first lens group, wherein the first holder is movable in the optical axis direction of the first lens group;
   a second holder having a second lens group, wherein the second holder is movable in the optical axis direction of the first lens group;
   a non-driving guide shaft connected to the first holder and not the second holder, the first holder being movable in the optical axis direction along the non-driving guide shaft;
   a drive shaft connected to the second holder and not the first holder, which drives the second holder in the optical axis direction;
   a first cam follower extending in a right angle direction to the optical axis from the first holder;
   a second cam follower extending parallel to the first cam follower from the second holder; and
   a cam member having first and second cams arranged along the optical axis and respectively engaging the first and second cam followers, wherein
      when the drive shaft drives the first holder in the optical direction, the second holder is driven in the optical direction along the non-driving guide shaft via the first and second cam followers engagement with the cam member to maintain a specific relationship with the first holder.

2. The driving apparatus according to claim 1, wherein said cam member is a plate cam member.

3. The driving apparatus according to claim 1, wherein said cam member is a cylindrical cam member.

4. The driving apparatus according to claim 1, wherein said cam member uses an endface of the cam member as the first cam or the second cam.

5. The driving apparatus according to claim 1, wherein said second cam of the cam member has first and second mutually opposed cam surfaces having a gap therebetween wider than the second cam follower.

6. The driving apparatus according to claim 1, wherein said drive shaft is friction bonded to the second holder.

7. A driving apparatus comprising:
   a first holder having a first lens group, wherein the first holder is movable in the optical axis direction of the first lens group;
   a second holder having a second lens group, wherein the second holder is movable in the optical axis direction of the first lens group;
   a first drive shaft friction bonded to the first holder and not the second holder, which drives the first holder in the optical axis direction at a first speed;
   a second drive shaft friction bonded to the second holder and not the first holder, which is configured to drive the second holder in the optical axis direction at a second speed, less than the first speed;
   a first cam follower extending in a right angle direction to the optical axis from the first holder;
   a second cam follower extending parallel to the first cam follower from the second holder; and
   a cam member having first and second cams arranged along the optical axis and respectively engaging the first and second cam followers, wherein
      when the first drive shaft drives the first holder in the optical direction, the second holder is primarily driven in the optical direction along the non-driving guide shaft via the first and second cam followers engagement with the cam member to maintain a specific relationship with the first holder, and supplementally driven by the second drive shaft, and
      the friction bonding of the first drive shaft to the first holding and of the second drive shaft to the second holder absorbs the speed difference between the first and second speeds being via sliding of the first drive shaft with the first holder and sliding of the second drive shaft with the second holder.

8. A photographic apparatus comprising:
   an image sensor;
   a optical system having a first lens group and a second lens group to make a object image on the image sensor;
   a first holder having the first lens group, wherein the first holder is movable in the optical axis direction of the first lens group;
   a second holder having the second lens group, wherein the second holder is movable in the optical axis direction of the first lens group;
   a non-driving guide shaft connected to the first holder and not the second holder, the first holder being movable in the optical axis direction along the non-driving guide shaft;
   a drive shaft connected to the second holder and not the first holder, which drives the second holder in the optical axis direction;
   a first cam follower extending in a right angle direction to the optical axis from the first holder;
   a second cam follower extending parallel to the first cam follower from the second holder; and
   a cam member having first and second cams arranged along the optical axis and respectively engaging the first and second cam followers, wherein
      when the drive shaft drives the first holder in the optical direction, the second holder is driven in the optical direction along the non-driving guide shaft via the first and second cam followers engagement with the cam member to maintain a specific relationship with the first holder.

* * * * *